United States Patent Office 3,325,295
Patented June 13, 1967

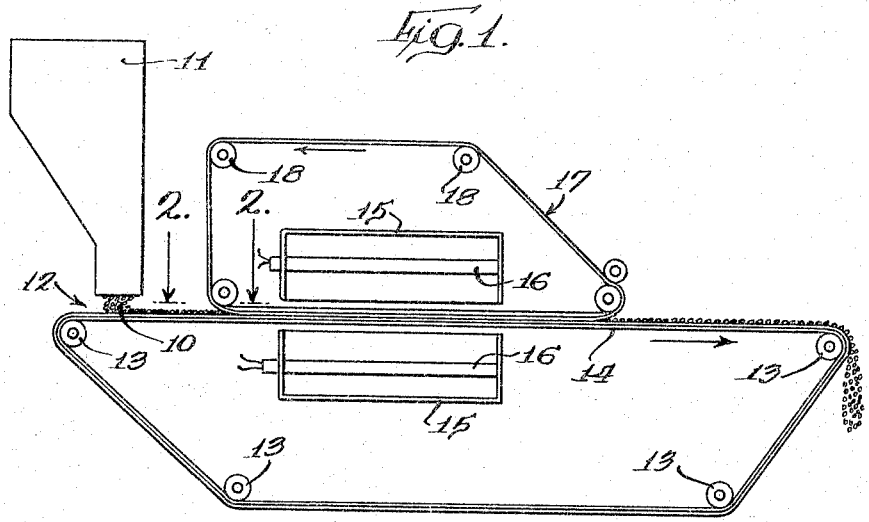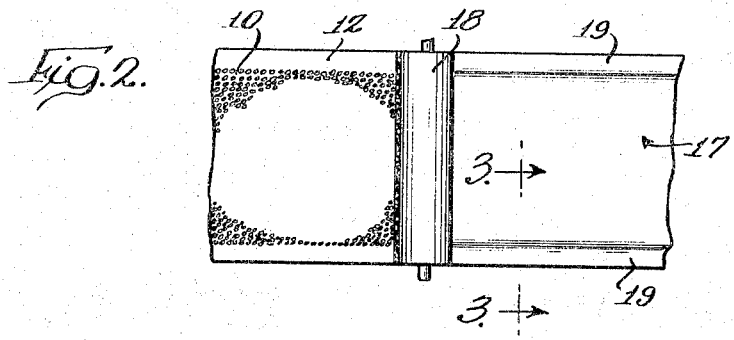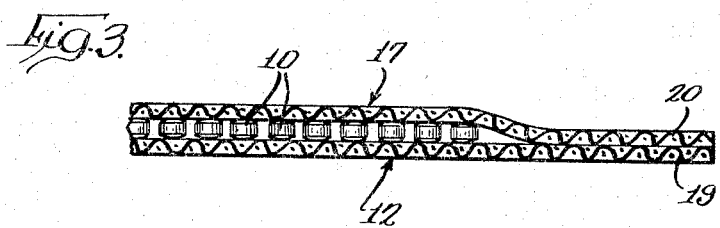

3,325,295
METHOD FOR PRODUCING EXPANDED CONFECTIONS
Alvin W. Vande Ven, Elmhurst, Ill., assignor to E. J. Brach & Sons, Chicago, Ill., a corporation of Illinois
Filed Aug. 13, 1964, Ser. No. 389,261
4 Claims. (Cl. 99—134)

This invention relates to the production of expanded confections such as for example malted milk balls, mint puffs and the like of improved character and to the novel method and means for producing same.

Confections of the foregoing class are composed in major amounts of solids by weight of corn syrup in addition to other materials such as for example malted milk and sugar, and have heretofore been made by forming pieces from dough-like batches of material which were subsequently expanded under controlled conditions of heat and vacuum to provide a crisp aerated texture.

It is an object of the present invention to provide confections of the aforesaid class of enhanced eating quality, tenderness and uniformity of texture, by a novel method and means.

In general, I accomplish the objects of the present invention by forming a blend of dry powdered ingredients by initially compacting them in generally conventional tabletting apparatus. I then subject these pieces or tablets to a sintering operation while enveloped and under controlled conditions of temperature to amalgamate and fuse the powdered components and to provide the tablets with a homogeneous character. I thereafter subject these sintered pieces to expansion or puffing while heated in a vacuum chamber to form the final product.

The following is a typical example of a formulation for malted milk flavored expanded confections in percent by weight:

EXAMPLE I

| | |
|---|---|
| Dried corn syrup solids | 51.7 |
| Malted milk powder | 35 |
| Corn Sugar | 5 |
| Dry Malt syrup (flavor) | 8 |
| Salt | .3 |

The following is a typical formula for other flavored expanded confections such as mint puffs in percent by weight:

EXAMPLE II

| | |
|---|---|
| Dried corn syrup solids | 69 |
| Corn sugar | 29 |
| Lubricant | 1.5 |
| Flavor and coloring | .5 |

The lubricant can be a normally solid edible fat such as for example coconut butter or magnesium stearate and serves as a tabletting aid. It is not employed in Example I since the malted milk contains sufficient amount of fat for such purpose.

The foregoing formulations, as previously indicated, are composed of dry powdered materials, and with an overall moisture content of approximately 2–2½%. For good puffing character the dried corn syrup employed in the foregoing examples has a dextrose equivalent of 42.

The dry components are mixed in a suitable blender, cooled, and a small amount of an anti-caking agent, such as calcium silicate, is added for flowability in tabletting. Tabletting is accomplished in standard pharmaceutical tabletting apparatus with pressures up to about 3 tons per square inch. The tablets can be of any size and shape desired, typical ones being approximately $31/64$ of an inch in diameter and $3/16$ of an inch in thickness, the thickness being a prime factor in governing the weight and shape of the finished product.

These self-sustaining tablets are then subjected to sintering, a typical arrangement of apparatus for such purpose being diagrammatically shown in the accompanying drawings, wherein:

FIG. 1 is a side elevational view of the sintering apparatus;

FIG. 2 is a section on the line 2—2 of FIG. 1;

FIG. 3 is a relatively enlarged section on the line 3—3 of FIG. 2.

Referring to the drawings, the tablets 10 are fed from a tablet press through vibratory feeder 11 and disposed in a single layer onto the upper horizontal surface of endless belt 12, driven by means not shown. This belt 12 is carried over the rolls 13 supported on wire mesh belt 14, the belt 12 requiring support in view of its flexible nature and composition, it being composed of fiberglass reinforced Teflon (tetrafluoroethylene).

The supported belt or conveyor 12 passes between the opposed ovens 15, 15 heated by means of quartz infrared lamps 16, 16. As the conveyor belt 12 passes between the heating units 15, 15, a second similar endless Teflon belt 17 passing over the rollers 18 comes down into contact with the tablets 10 on the belt 12. As will appear from FIG. 2, the tablets 10 are distributed on belt 12 so as to leave unencumbered marginal edge portions 19 whereas marginal edge portions 20 of the belt 17 may come into contact therewith and form a closed, although not hermetically sealed, envelope. It is, however, desirable that this enveloping or edgewise closure of the adjacent belts take place so as to minimize substantial moisture loss and to insure uniform heat distribution through the body of the tablets 10.

Although the drawings show one type of oven it will be understood that other types of ovens can be used, such as for example a convection oven or one employing high frequency heat.

In a typical operation, the heat inside the oven may range from about 400° to about 480° F. with the heat range of the tablet from about 220° to about 270° F., the time of passage through the heating zone being from about 2 to about 4 minutes. During this time the powdered particles amalgamate to form a homogeneous mass, the moisture content of the tablets out of the oven being substantially the same as that going in.

It will be understood that the time and temperature of heating can be varied, the hotter the oven the shorter the cycle; and conversely, the cooler the oven the longer the cycle. There is no perceptive change in dimension of the tablets on passing through the sintering apparatus.

The sintered tablets are then subjected to conventional heat puffing, and this is accomplished by placing them in a vacuum oven having a vacuum of from about 28 to about 29.5 inches mercury. While being subjected to this vacuum the tablets are heated, while disposed on jacketed trays, at a temperature starting at about 178° F. for about 20 minutes and after reaching 208–214° F. for 40 additional minutes. After this, the heat is turned off, the vacuum is released and the expanded candy is ready for use or further processing, such as for example chocolate coating.

I claim:
1. The method for making puffed corn syrup candy which comprises tabletting a dry powdered candy mixture containing a major amount by weight of dried corn syrup, consolidating the compacted powder by subjecting the tabletted particles to homogenizing sintering conditions, by moving them through a heated zone between opposed enveloping surfaces to prevent substantial loss of moisture content and puffing the resulting tablets by heating them in a vacuum.

2. The method for making puffed corn syrup candy which comprises tabletting a dry powdered candy mixture containing a major amount by weight of dried corn syrup, homogenizing said tablets by heating them at a temperature of from about 220° F. to about 270° F. by moving them through a heated zone between opposed enveloping surfaces to prevent substantial loss of moisture content until the powder particles are amalgamated, and puffing the resulting tablets by heating them in a vacuum.

3. The method for making puffed corn syrup candy which comprises tabletting a dry powdered candy mixture containing a major amount by weight of dried corn syrup and having a moisture content of approximately 2–2½%, homogenizing said tablets by heating them at a temperature of from about 220° F. to about 270° F. while enveloped to prevent substantial loss of moisture content and to insure substantially uniform heat distribution through the body of the tablets until the powder particles are amalgamated, and puffing the resulting tablets by heating them in a vacuum at a temperature of from about 208° F. to about 214° F. and at subatmospheric pressure of about 28 to about 29½ inches barometric.

4. The method for making puffed corn syrup candy which comprises tabletting a dry powdered candy mixture containing a major amount by weight of dried corn syrup, homogenizing said tablets by moving them through a heated zone between opposed enveloping surfaces to prevent substantial loss of moisture content and to amalgamate the component powder particles, and puffing the resulting particles in a vacuum chamber while at a temperature of from about 208° F. to about 214° F.

References Cited

UNITED STATES PATENTS

| 2,841,528 | 7/1958 | Myhre | 99—134 X |
| 3,020,164 | 2/1962 | Forkner | 99—134 |
| 3,169,888 | 2/1965 | Ryan et al. | 99—134 X |

A. LOUIS MONACELL, *Primary Examiner.*

RAYMOND N. JONES, *Examiner.*

S. E. HEYMAN, *Assistant Examiner.*